(12) United States Patent
Parthasarathy (10) Patent No.: US 9,324,099 B2
(45) Date of Patent: Apr. 26, 2016

(54) DYNAMICALLY ALLOCATING RESOURCES BETWEEN COMPUTER PARTITIONS

(75) Inventor: Mohan Parthasarathy, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 1061 days.

(21) Appl. No.: 12/644,021

(22) Filed: Dec. 22, 2009

(65) Prior Publication Data

US 2010/0185481 A1  Jul. 22, 2010

(30) Foreign Application Priority Data

Jan. 20, 2009 (IN) .............................. 125/CHE/2009

(51) Int. Cl.
| | |
|---|---|
| *G06F 15/173* | (2006.01) |
| *G06Q 30/06* | (2012.01) |
| *G06Q 10/06* | (2012.01) |
| *G06F 9/50* | (2006.01) |

(52) U.S. Cl.
CPC .............. *G06Q 30/06* (2013.01); *G06F 9/5077* (2013.01); *G06Q 10/06* (2013.01)

(58) Field of Classification Search
CPC ... G06F 9/5077; G06F 9/5061; G06F 9/5083; G06Q 10/06; G06Q 30/06
USPC ........................................................ 709/226
See application file for complete search history.

(56) References Cited

U.S. PATENT DOCUMENTS

| | | | | |
|---|---|---|---|---|
| 7,451,183 B2* | 11/2008 | Romero et al. | ............... | 709/206 |
| 2004/0010581 A1* | 1/2004 | Dodapati | ................ | G06F 21/73 709/224 |
| 2004/0107281 A1* | 6/2004 | Bose | ....................... | H04L 29/06 709/226 |
| 2005/0044228 A1* | 2/2005 | Birkestrand | .......... | G06F 9/5072 709/226 |
| 2006/0218277 A1* | 9/2006 | Birkestrand | .......... | G06F 9/5061 709/226 |
| 2008/0080396 A1* | 4/2008 | Meijer et al. | .................. | 370/254 |

* cited by examiner

*Primary Examiner* — John Macilwinen
(74) *Attorney, Agent, or Firm* — HGF Limited (57) ABSTRACT

Embodiments of the present invention provide a computer system having a plurality of partitions, comprising a pay-per-use (PPU) system including at least one computing resource available for use in the computer system on a chargeable basis, a resource management system for receiving a computing resource request from one of the partitions and allocating computing resources amongst the partitions, wherein the resource management system is arranged to allocate a computing resource from the PPU system to the requesting partition according to the received request without charge by the PPU system, and to allocate a corresponding computing resource to the PPU system from another of the partitions.

21 Claims, 6 Drawing Sheets

DYNAMICALLY ALLOCATING RESOURCES BETWEEN COMPUTER PARTITIONS

RELATED APPLICATIONS

Benefit is claimed under 35 U.S.C. 119(a)-(d) to Foreign application Serial No. 125/CHE/2009 entitled "SYSTEM AND METHOD FOR DYNAMICALLY ALLOCATING RESOURCES" by Hewlett-Packard Development Company, L.P., filed on Jan. 20, 2009, which is herein incorporated in its entirety by reference for all purposes.

BACKGROUND

A computer system has limited computing resources and those computing resources must be divided amongst workloads executing on the computer system. However, the computing resources required by each of a plurality of workloads executing on a computer system typically vary dynamically. However, it is difficult for a computer system to meet the dynamically varying computing resource requirements of the plurality of workloads. For example, it is difficult to continuously reallocate computing resources amongst the workloads. Furthermore, certain types of workload require that their computing resources requirements are met within a predetermined time.

It is an object of embodiments of the invention to at least mitigate one or more of the problems of the prior art.

BRIEF DESCRIPTION OF THE DRAWINGS

Embodiments of the invention will now be described by way of example only, with reference to the accompanying figures, in which.

DETAILED DESCRIPTION OF EMBODIMENTS OF THE INVENTION

Figure 1:
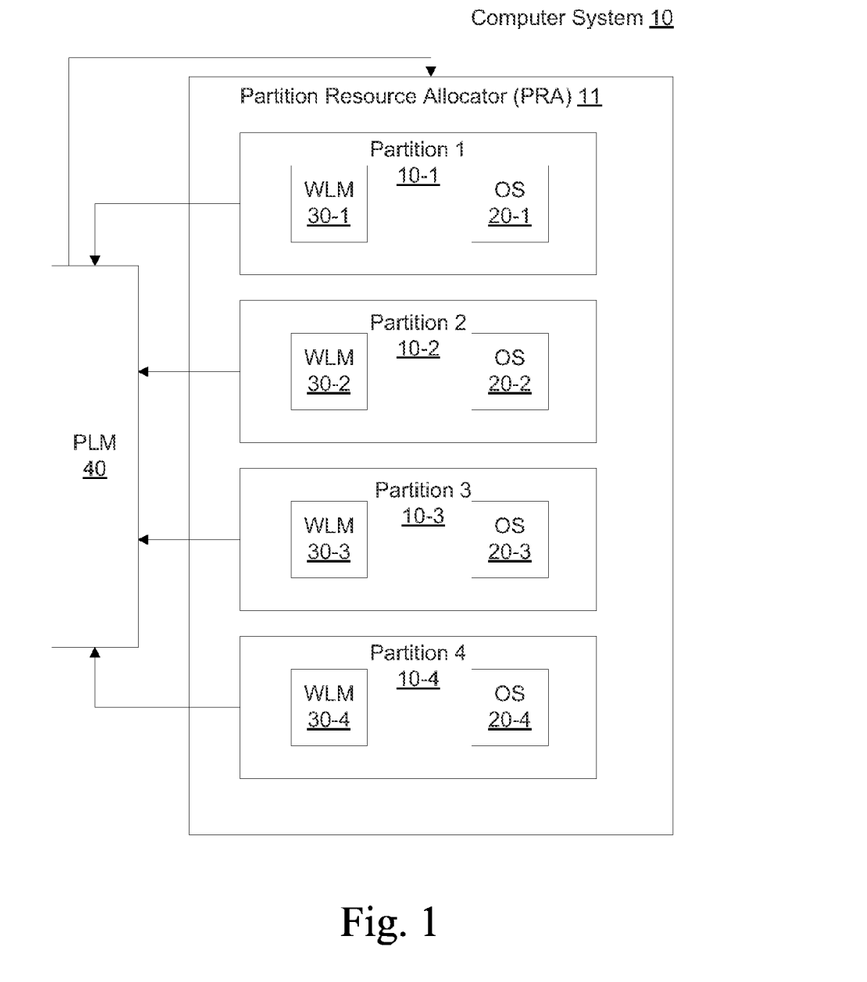
FIG. 1 shows an illustration of a computer system including a plurality of logical partitions according to an embodiment of the invention.

FIG. 1 depicts a computer system 10 having four logical partitions 10-1, 10-2, 10-3, 10-4. It will be realised that the illustration of four logical partitions is merely exemplary and that any number of logical partitions may be supported. Furthermore, the computer system 10 need not necessarily be a single computer. The computer system 10 may be formed by a plurality of computers cooperating to share resources between a plurality of partitions spread across the plurality of partitions.

The four logical partitions 10-1, 10-2, 10-3, 10-4 of the computer system 10 each support their own operating system 20-1, 20-2, 20-3, 20-4. The operating systems 20-1, 20-2, 20-3, 20-4 run by the partitions 10-1, 10-2, 10-3, 10-4 may be the same, different versions of the same operating system or entirely different operating systems. Each partition 10-1, 10-2, 10-3, 10-4 includes a workload manager (WLM) 30-1, 30-2, 30-3, 30-4 which manages computing resources (resources of the computer system) allocated to the respective partition amongst processes executing within that partition. Each WLM 30-1, 30-2, 30-3, 30-4 is communicatively coupled to a partition load manager (PLM) 40 which manages the distribution of computing resources amongst the logical partitions 10-1, 10-2, 10-3, 10-4. The computer system 10 further includes a partition resource allocator (PRA) 11 which allocates computing resources to each of the logical partitions 10-1, 10-2, 10-3, 10-4 in response to instructions received from the PLM 40.

Each WLM 30-1, 30-2, 30-3, 30-4 aims to ensure that one or more processes executing in the respective logical partition 10-1, 10-2, 10-3, 10-4 meet one or more service level objectives (SLOs). A SLO may be defined in terms of a metric such as an application response time goal. A performance monitor process (not shown) may monitor the performance of each of one or more processes executing in a partition and provide performance information to the WLM 30-1, 30-2, 30-3, 30-4. The WLM 30-1, 30-2, 30-3, 30-4 is arranged to compare the performance information against the one or more SLOs for each process and to determine whether the computing resources allocated to that partition 10-1, 10-2, 10-3, 10-4 are optimally allocated amongst the processes executing in the partition 10-1, 10-2, 10-3, 10-4. The WLM 30-1, 30-2, 30-3, 30-4 may increase, decrease or leave unchanged a portion of the computing resources allocated to the respective partition 10-1, 10-2, 10-3, 10-4 which are dedicated to each process.

If a demand for computing resources required by processes executing in a partition cumulatively exceed a total of the computing resources allocated to the partition 10-1, 10-2, 10-3, 10-4, then the WLM 30-1, 30-2, 30-3, 30-4 of that partition 10-1, 10-2, 10-3, 10-4 communicates a request for further computing resources to the PLM 40. The request may identify the requesting partition 10-1, 10-2, 10-3, 10-4 and a type of computing resource required e.g. a processing resource.

The PLM 40 examines the computing resource request received from the WLM 30-1, 30-2, 30-3, 30-4 and determines whether the request can be satisfied. In response to the request, the PLM 40 may increase, decrease or leave unchanged a distribution of computing system resources amongst the partitions 10-1, 10-2, 10-3, 10-4. If the PLM 40 decides to change a distribution of computing resources amongst the partitions 10-1, 10-2, 10-3, 10-4, then information concerning the revised distribution is communicated to the PRA 11. The PRA 11 reallocates computing resources between the partitions 10-1, 10-2, 10-3, 10-4. This may result in an effective resizing of two or more of the partitions 10-1, 10-2, 10-3, 10-4, or the allocation of a previously unallocated computing resource to a partition in response to the information received from the PLM 40. In this way, computing resources may be dynamically distributed amongst the partitions 10-1, 10-2, 10-3, 10-4 of the computer system 10 in response to a dynamically varying computing resource requirement of processes executing in multiple partitions 10-1, 10-2, 10-3, 10-4.

Figure 2:
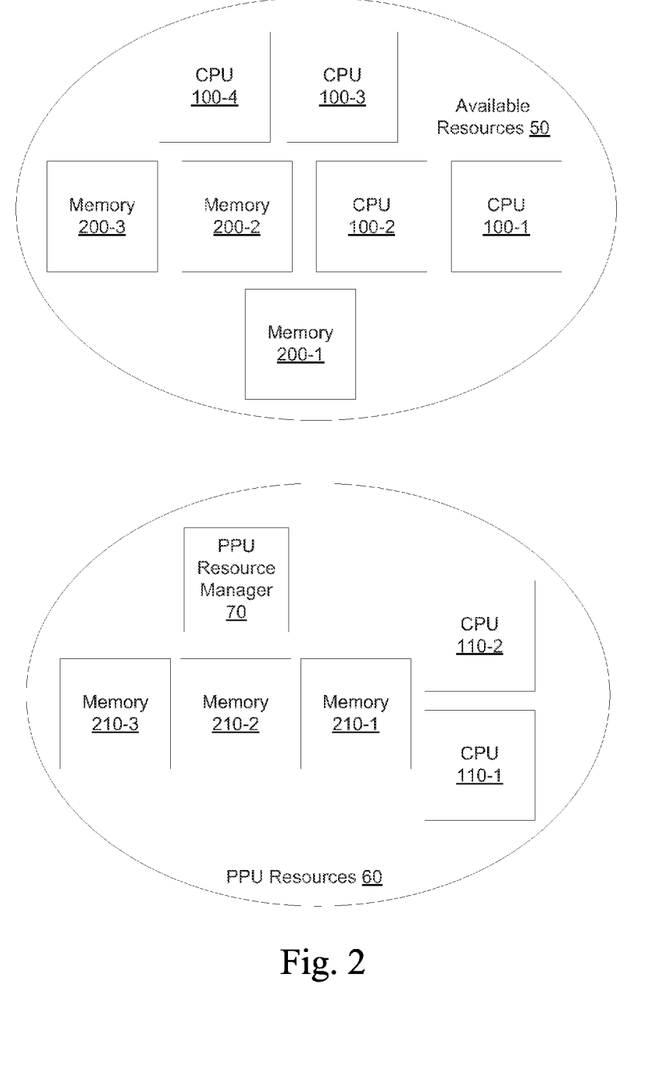
FIG. 2 shows an exemplary illustration of groups of computing resources in the computing system.

FIG. 2 shows an illustration of computing resources available in the computing system 10.

Computing resources are organised into at least two groups. An available group of computing resources 50 includes those computing resources which are currently available to the PLM 40 for distribution amongst the partitions 10-1, 10-2, 10-3, 10-4. It is noted that the available group of computing resources 50 may include those computing resources already allocated to a partition 10-1, 10-2, 10-3, 10-4. The available resources 50 may comprise one or more different types of computing resources, including CPUs 100 and memory 200. Computing resources may further include communication devices or any other types of computing resource. In the illustrated example the available resources 50 comprise four CPUs 100-1, 100-2, 100-3, 100-4 and three memory units 200-1, 200-2, 200-3.

A second group of computing resources is represented by Pay-Per-Use (PPU) computing resources 60. The PPU resources 60 are computing resources which are available for use in the computer system 10 on a chargeable basis. PPU resources 60 may be obtained for use on a temporary basis, upon either an advance payment basis, such as for a predetermined time period, or may be charged following use. Alternatively, PPU resources 60 maybe purchased for continual use. For example, an operator of the computer system 10 may purchase a right to use an additional CPU 110-1 from a computer system provider. Once purchased, the CPU 110-1 may be activated by provision of a codeword to a PPU resource manager 70 which then releases that CPU 100-1 to the group of available computing resources 50. It will be realised that term CPU may represent a processor or a core of a multi-core processor. The codeword may allow permanent activation of the computing resource or activation of the computing resource for a predetermined period of time, after which the computing resource is returned to the PPU group 60 of resources. In this way, the available computing resources 50 of the computer system 10 may be increased without physical modification of the computer system 10. It will be realised that the composition of the available resources 50 and PPU resources 60 is merely illustrative and that other types and quantities of computing resources may be included in each group.

If one of the partitions 10-1, 10-2, 10-3, 10-4 of the computer system 10 requires additional computing resources, these may be reallocated to that partition from one or more of the other partitions 10-1, 10-2, 10-3, 10-4 which may be one or more of underutilising their allocated computing resources, and/or supporting processes of a lower priority such that the computing resources allocated to those partitions 10-1, 10-2, 10-3, 10-4 may be transferred to the partition requiring additional computing resources. For example, if partition 2 10-2 is running a high-priority process which is failing to meet its one or more SLOs, then the PRA 11 may delete a CPU 100-2 from the available resources 50 allocated to another partition 10-1, 10-3, 10-4 and add that CPU 100-2 to partition 2's allocation of computing resources. However, the time taken to delete a CPU 100-2 from a partition's allocation of computing resources is unpredictable and may take an appreciable amount of time. Thus, the time before the CPU 100-2 is available for use within partition 2 10-2 is unpredictable and the additional CPU 100-2 may not be available for use in partition 2 for a period of time. Some processes have very tightly defined SLOs and failure to meet those SLOs, even for a relatively short amount of time, may be problematic.

In embodiments of the present invention, the PRA 11 is arranged to allocate computing resources from the PPU resources 60 to a partition 10-1, 10-2, 10-3, 10-4 without the PPU resource manager 70 charging for use of those resources whilst a corresponding computing resource is unallocated, or deleted, from another partition 10-1, 10-2, 10-3, 10-4. That is, a computing resource from amongst the PPU resources 60 is temporarily utilised by one of the partitions 10-1, 10-2, 10-3, 10-4 without charge by PPU resource manager 70 whilst a corresponding computing resource is removed from use by another of the partitions 10-1, 10-2, 10-3, 10-4. The removed computing resource is allocated to the PPU resources 60 to replace the computing resource used without charge. Advantageously, this allows computing resources to be quickly made available to a partition requesting additional computing resources with a predictable delay.

A process of reallocating resources amongst two partitions will now be described with reference to FIGS. 3-6.

Figure 3:
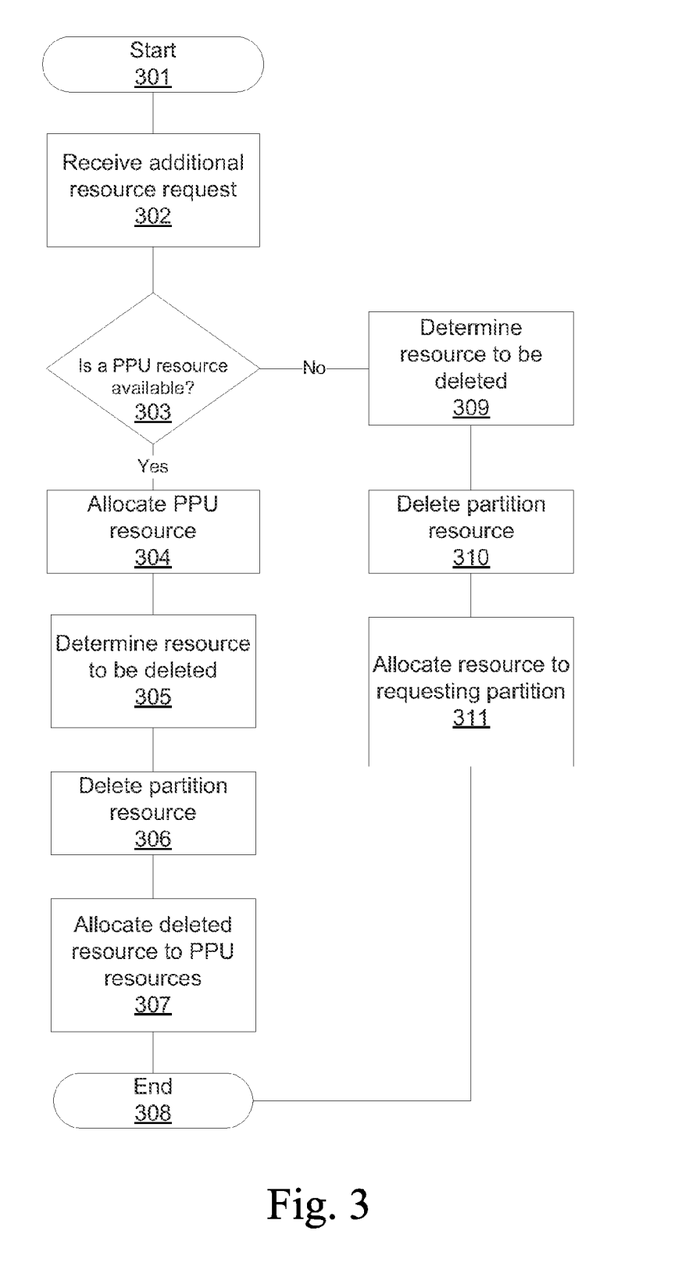
FIG. 3 shows a method according to an embodiment of the invention.

The method described with reference to FIG. 3 involves the reallocation of CPUs. It will be realised however that the method may be applied to any type of computing resource.

Figure 4:
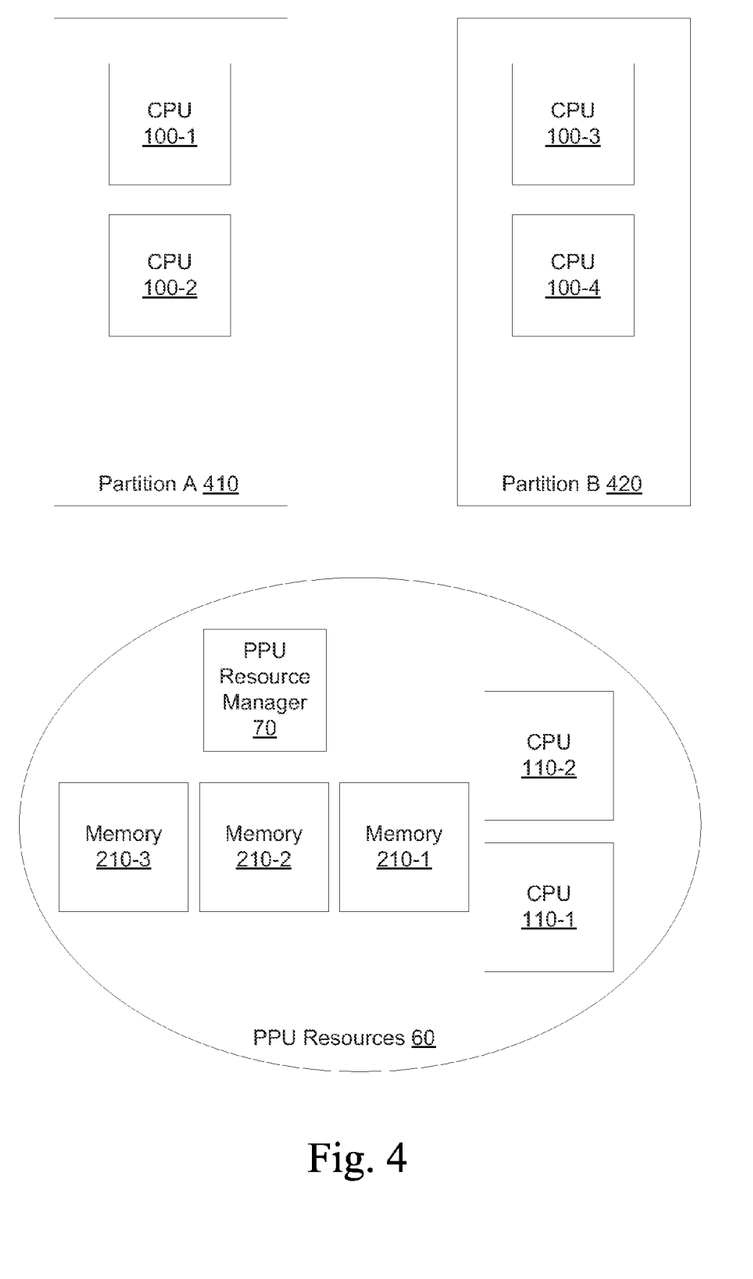
FIG. 4 shows an illustration of a pay-per-use group of computing resources and resources allocated to two partitions in the computing system during the method of FIG. 3.
Figure 5:
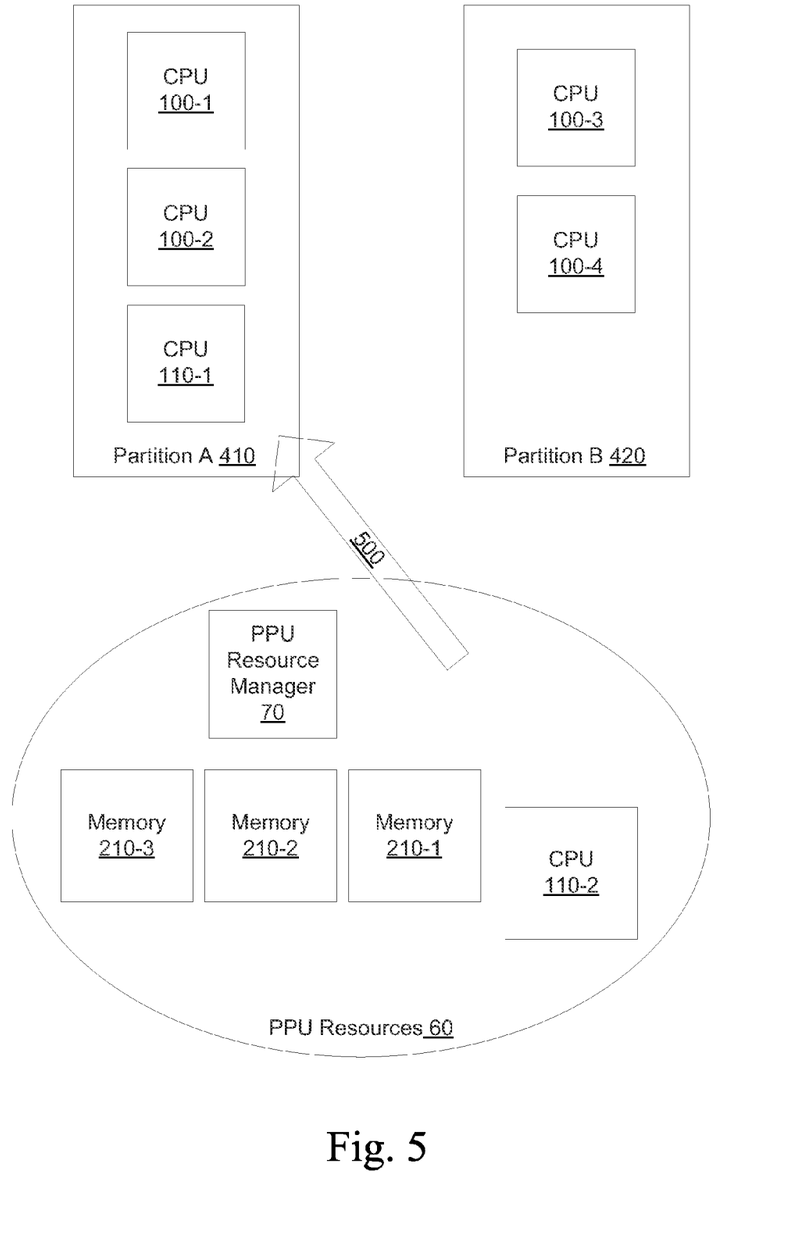
FIG. 5 shows another illustration of a pay-per-use group of computing resources and resources allocated to two partitions in the computing system during the method of FIG. 3.

The method begins in step 301. In step 302 a request for an additional computing resource is received from a first partition. As an example, two example partitions A and B 410, 420 are shown in FIG. 4. Each of the partitions 410, 420 has two CPUs 100-1, 100-2; 100-3, 100-4 allocated at the time of step 301. In step 302 the WLM 30 of partition A may determine that one or more processes executing in that partition 410 are failing to meet their SLOs and communicate a request for additional processing resources to the PLM 40.

In step 303 it is determined whether a PPU resource 60 corresponding to the requested resource is available. That is, whether the group of PPU resources 60 includes a computing resource of the requested type. For example, the PRA 11 may determine, by communication with the PPU resource manager 70, that a processing resource 110-1 is present in the PPU resources 60.

If a PPU resource 60 of the requested type is available then processing moves to step 304 wherein the PPU resource 110-1 is allocated to the partition which requested the additional computing resource. For example, the processing resource 110-1 is allocated to partition A 410 from the PPU resources 60 as denoted in FIG. 5 with arrow 500. In step 304, the PPU resource manager 70 may be requested to release the processing resource 110-1 from the PPU resources and informed that the computing resource will shortly be replaced, such that the PPU resource manager 70 allows the allocation of a computing resource without charge for use of the computing resource.

In step 305 a computing resource to be deleted or unallocated from a second partition is determined. This step may include determining which other partition has a computing resource allocated to it of the type recently allocated to the other partition from the PPU resources 60. The determined computing resource may be an underutilised resource or a computing resource allocated to a partition executing one or more lower priority processes. Following step 305 a partition is selected from which a computing resource, corresponding to the allocated PPU resource 60, is to be deleted or unallocated. For example, it may be determined that partition B 420 is underutilising its allocated processing resources 100-3, 100-4. However, if all other partitions are executing processes of equal priority and have equal utilisation of their allocated computing resources, the partition may be selected randomly or on another basis, such as a round-robin or carousel type basis.

Figure 6:
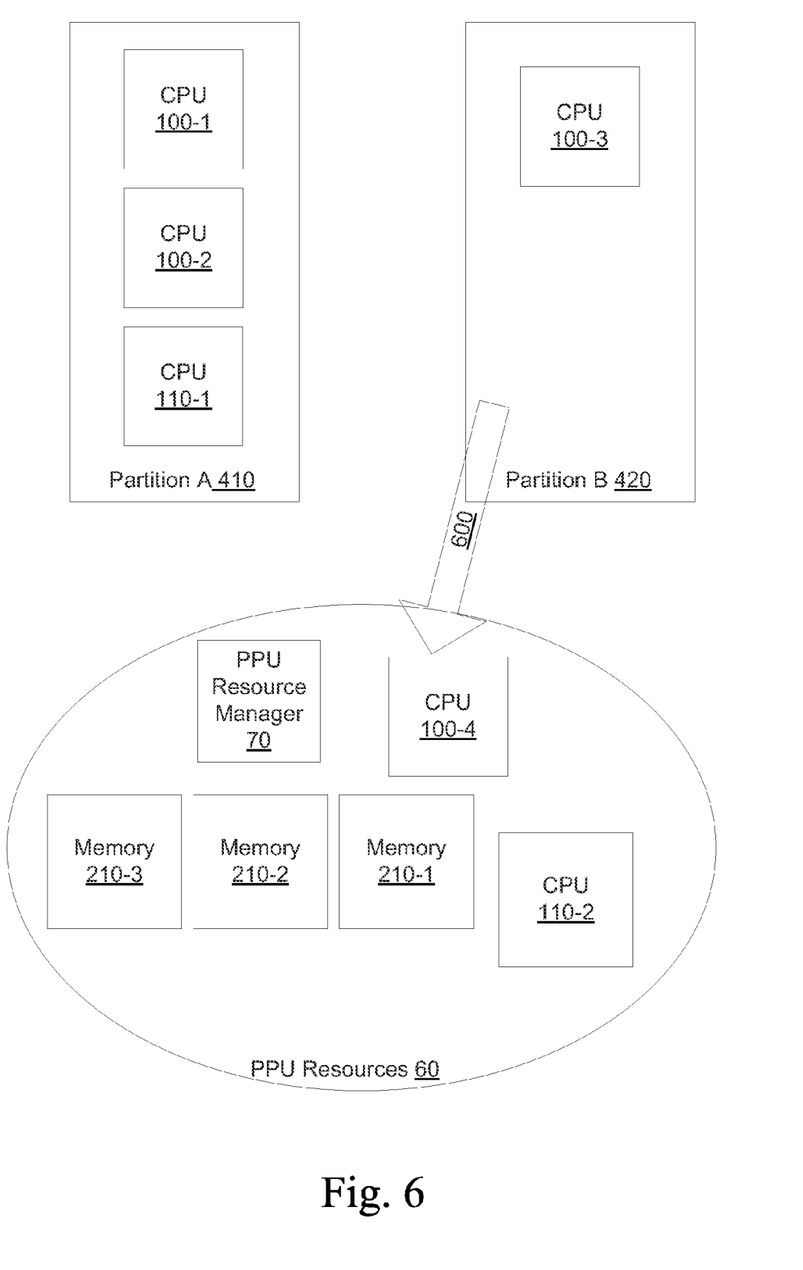
FIG. 6 shows a further illustration of a pay-per-use group of computing resources and resources allocated to two partitions in the computing system during the method of FIG. 3.

In step 306 a resource corresponding to the allocated PPU resource 60 is deleted from the partition selected in step 305. In step 307 the deleted resource is allocated to the PPU resources 60 to replace that released in step 304. For example, as shown in FIG. 6, a processing resource 100-4 is reallocated to the PPU resources 60 from partition B 420, as represented by arrow 600. The method then ends in step 308.

However, if in step 303 it was determined that a PPU resource 60 corresponding to the requested computing resource type was not available, then processing moves to step 309 wherein a computing resource to be deleted from another partition is determined. As in step 305, in order to select the partition from which a resource is to be deleted or unallocated, step 309 may involve determining a partition which has an underutilised resource or which other partition has one or more lower priority processes utilising its allocated resources. In step 310 a computing resource is deleted from the partition selected in step 309 and the deleted resource is allocated to the requesting partition in step 311. The method then ends in step 308.

Advantageously, embodiments of the present invention allow computing resources to be quickly provided for additional use in a partition. Furthermore, a time between a partition requesting an additional computing resource and the computing resource being available for use in that partition may be predictably determined.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A computer system comprising:
   first and second partitions, said second partition having at least one available computing resource for reallocation to said first partition;
   a pay-per-use (PPU) system to provide PPU computing resources for use in said computer system on a chargeable basis; and
   a resource management system to:
      in response to a request for a computing resource from the first partition, determine whether the PPU system has a PPU computing resource available for use in the first partition,
      in response to a determination that the PPU system has a PPU computing resource available for use in the first partition, allocate the PPU computing resource to the first partition before deleting a corresponding computing resource from the second partition, and
      in response to a determination that the PPU system does not have a PPU computing resource available for use in the first partition, delete the corresponding computing resource from the second partition before allocating the deleted corresponding computing resource from the second partition to the first partition.

2. A computer system as recited in claim 1 wherein:
   the resource management system is to receive the computing resource request indicating a required computing resource type, and to allocate the computing resource from the PPU system corresponding to the requested computing resource type.

3. A computer system as recited in claim 1, wherein the second partition from which the corresponding computing resource is deleted is selected according to a utilization level of computing resources and/or to a priority of processes executing in the second partition.

4. A computer system as recited in claim 1, wherein, after allocating the PPU computing resource to the first partition and after deleting the corresponding computing resource from the second partition, the resource management system is to allocate the deleted corresponding computing resource from the second partition to the PPU system.

5. A computer system as recited in claim 1, wherein the PPU system comprises a PPU resource manager to release the PPU computing resource without charge in response to the request from the resource management system.

6. A computer system as recited in claim 1, wherein the resource management system comprises a partition load manager for determining an allocation of available computing resources between the first and second partitions.

7. A computer system as recited in claim 1, wherein the first partition includes a workload manager to compare a performance of at least one process executing within the first partition against one or more predetermined metrics and to request an allocation of further computing resources to the first partition according to the comparison.

8. A method of allocating computing resources in a computer system having first and second partitions, said method comprising:
   in response a request for a computing resource from the first partition, determining, by a processor, whether a pay-per-use (PPU) system has a PPU computing resource available for use in the first partition on a chargeable basis;
   in response to a determination that the PPU system has a PPU computing resource available for use in the first partition, allocating the PPU computing resource to the first partition before deleting a corresponding computing resource from the second partition; and
   in response to a determination that the PPU system does not have a PPU computing resource available for use in the first partition, deleting the corresponding computing resource from the second partition before allocating the deleted corresponding computing resource from the second partition to the first partition.

9. A method as recited in claim 8, further comprising;
after allocating the PPU computing resource to the first partition and deleting the corresponding computing resource from the second partition, allocating the deleted corresponding computing resource from the second partition to the PPU system.

10. A method as recited in claim 8, wherein the request is sent by the first partition in response to a comparison of performance information of one or more processes against a service level objective.

11. A method as recited in claim 8 further comprising allocating the computing resource from the PPU system to the first partition in response to determining that the computing resource is not available in a resource pool of the computer system.

12. A method as recited in claim 8 wherein the second partition from which the corresponding computing resource is deleted is determined according to a utilization level of computing resources and/or a priority of processes executing in the second partition.

13. A method as recited in claim 8 further comprising requesting a PPU resource manager to release the computing resource without charge.

14. A computer system comprising:
computing resources including CPUs and memory;
logical partitions including first and second partitions;
a pay-per-use (PPU) system to control an availability of chargeable PPU computing resources according to predetermined criteria; and
a partition resource allocator to:
receive a request for a computing resource from the first partition,
in response to the request, determine whether the PPU system has a PPU computing resource available for use in the first partition,
in response to a determination that the PPU system has a PPU computing resource available for use in the first partition, allocate the PPU computing resource to the first partition before deleting a corresponding computing resource from the second partition, and
in response to a determination that the PPU system does not have a PPU computing resource available for use in the first partition, delete the corresponding computing resource from the second partition before allocating the deleted corresponding computing resource from the second partition to the first partition.

15. A computer system as recited in claim 1,
wherein, after allocating the PPU computing resource to the first partition and deleting the corresponding computing resource from the second partition, the partition resource allocator is to allocate the deleted corresponding computing resource from the second partition to the PPU system.

16. A computer system as recited in claim 14, wherein the first partition includes a workload manager to compare a performance of one or more processes executing in the first partition against a predetermined metric and to transmit the request for the computing resource in response to a result of the comparison.

17. A computer system as recited in claim 14, wherein the workload manager is to receive performance information indicating a performance of at least one process executing in the first partition from a performance monitor.

18. A computer system as recited in claim 14 wherein the PPU computing resources are distributed amongst a plurality of computer systems.

19. A computer system as recited in claim 14 wherein the PPU computing resource comprises one of a CPU or a memory.

20. A non-transitory computer-readable storage media storing instructions that, when executed by a processor, cause the processor to:
in response to receiving a request for a computing resource from a first partition, determine whether a pay-per-use (PPU) system has a PPU computing resource available for use in the first partition;
in response to a determination that the PPU system has a PPU computing resource available for use in the first partition, allocate the PPU computing resource to the first partition before deleting a corresponding computing resource from the second partition, and
in response to a determination that the PPU system does not have a PPU computing resource available for use in the first partition, delete the corresponding computing resource from the second partition before allocating the deleted corresponding computing resource from the second partition to the first partition.

21. A system as recited in claim 20, wherein, after allocating the PPU computing resource to the first partition and deleting the corresponding computing resource from the second partition, the instructions further cause the resource allocation manager to allocate the deleted corresponding computing resource from the second partition to the PPU system.

* * * * *